United States Patent [19]

Arnel

[11] Patent Number: 4,643,064
[45] Date of Patent: Feb. 17, 1987

[54] CODING ASSEMBLY

[75] Inventor: Donald M. Arnel, Davie, Fla.

[73] Assignee: Hallmark Cargo Services, Inc., Ft. Lauderdale, Fla.

[21] Appl. No.: 815,612

[22] Filed: Jan. 2, 1986

[51] Int. Cl.⁴ .............................................. B26F 1/00
[52] U.S. Cl. ....................................... 83/522; 83/591; 83/700; 83/701; 234/131
[58] Field of Search ............... 83/684, 687, 691, 700, 83/701, 925 R, 522; 234/131

[56] References Cited

U.S. PATENT DOCUMENTS

| | | | |
|---|---|---|---|
| 486,906 | 11/1892 | Stenwall | 83/619 X |
| 680,674 | 8/1901 | Franck | 83/619 X |
| 2,936,532 | 5/1960 | Willey | 83/619 X |
| 3,750,502 | 8/1973 | Ball | 83/687 X |

Primary Examiner—James M. Meister
Attorney, Agent, or Firm—John Cyril Malloy

[57] ABSTRACT

A coding assembly specifically designed to encode in a non-obtrusive manner, contained packages disposed on the interior of a shipping or storage carton through the utilization of strategically placed pairs of penetrating pins of sufficient length and sharpness to pass through the outer shipping carton and into the plurality of packages contained therein. Relative positions of the pins of a plurality of pin pairs will define the position of the puncture aperture in the respective packages and in turn define one of a plurality of predetermined codes. A clear material template is disposed in overlying relation to the puncture apertures for purposes of decoding.

14 Claims, 8 Drawing Figures

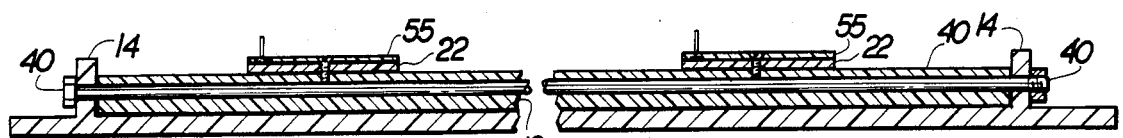
FIG. 3
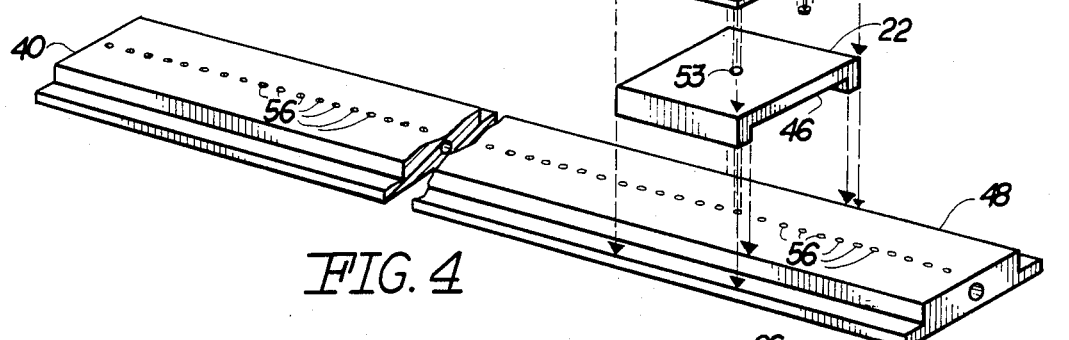
FIG. 4
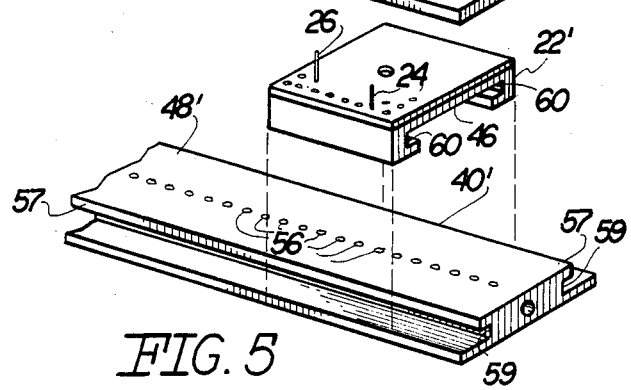
FIG. 6
FIG. 5
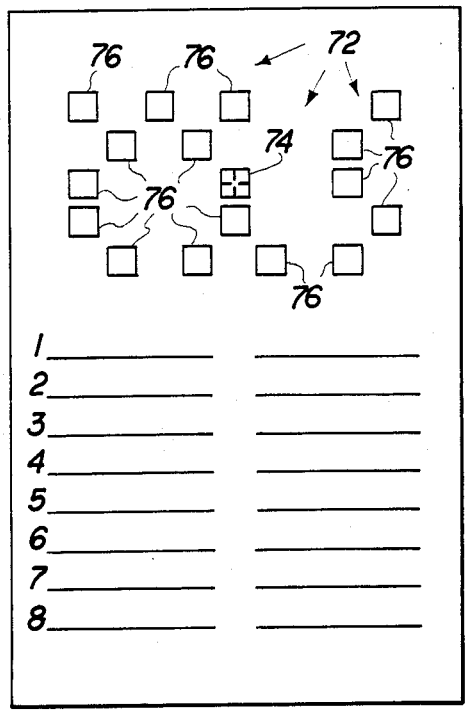
FIG. 7
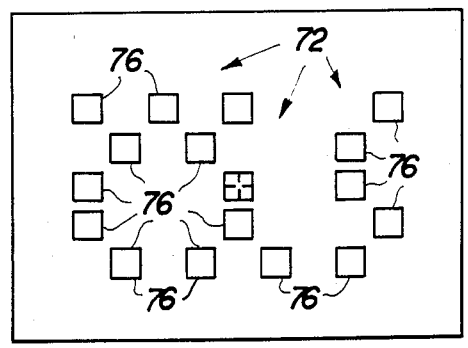
FIG. 8

CODING ASSEMBLY

BACKGROUND OF THE INVENTION

1. Field of the Invention

A coding apparatus used to apply a code which could be representative of geographical locations of intended distribution and sale of prepackaged goods which is structured to apply puncture apertures to an end or side of a package so as to encode the package in a non-obtrusive manner thereby insuring identity of the individual packages by means of their intended geographical points of sale.

2. Description of the Prior Art

In the sale and distribution of goods in interstate commerce including import and export trade between countries and territories, it is well recognized that sales and distributorship are granted for certain specified territorial areas. The granted territorial areas are in turn specifically designated and defined by geographical locations and boundaries. Accordingly, sale or distribution of packaged products into another's territorial area represents a serious violation of trade practices and frequently a loss of sales into the violated territorial area.

In order to stop such violation, attempts have been made to code packages with a predetermined code which can be readily checked when an investigator examines the packages and/or products found for sale in a given geographical area. Tampering or forgery of such codes raises an additional problem leading to the need in the prior art in this particular commercial area for a system and/or apparatus for coding packages in an efficient manner utilizing a coding system which will be difficult or impossible to forge and which is readily and easily applied to the packages without the necessity of excessive or unnecessary handling of the packages.

Typically, a plurality of packages are contained in a stacked array within a larger shipping carton or container. A preferred coding technique therefor would enable the coding of the individual packages, presented for sale, without the requirement of unpacking such plurality of packages from the shipping or storage container in which they are transported.

Accordingly, there is a need in this area of commerce for a coding system and mechanism to accomplish the proper encoding of contained packages in an efficient, nonobtrusive manner so as to overcome problems existing in the prior art relating to this field.

SUMMARY OF THE INVENTION

This invention relates to a coding system and apparatus specifically designed to concurrently encode a plurality of packages stacked or carried in a storage or shipping container in a manner which is difficult to change or alter, thereby providing a reliable identification as to intended or designated territorial area of sale intended for such packages.

More specifically, the subject coding assembly comprises a base dimensioned and configured to support one end of a shipping or storage carton thereon. A plurality of pins disposed into pin pairs are attached to and extend upwardly from the supporting portion or surface of the base. Each of the pins are specifically dimensioned and structured to penetrate a predetermined portion of the carton and extend therethrough into penetrating relation with the packages contained within the shipping carton and disposed adjacent to the end being penetrated and supported on the base of the coding assembly. The individual codes applied to the contained plurality of packages are dependent upon the relative locations and spacing of the puncture apertures placed in the individual packages. In turn, the location of the puncture apertures in each of the plurality of packages are defined by the position or placement, relative to one another, of the two pins comprising each pin pair.

Based on the above, each pin pair can be arranged to implant the same one of a plurality of codes on each of the packages maintained within the shipping container by preselecting the relative locations of the two pins of each pin pair. This is accomplished by designating one of the pins of each pin pair as a target pin and maintaining such target pin in a fixed reference position. The other pin of each pin pair may be designated a secondary pin and located in one of a plurality of other predetermined or preset positions in spaced disposition relative to the target pin. Each separate preset position of the secondary pin location determines a separate code which may be indicative of any predetermined destination such as a territorial region or area of sales of a product.

In order to more efficiently alter the code implanted on the individual packages by the plurality of pin pairs, each pin pair may be mounted on one of a plurality of plates wherein the plurality of plates each contain a pin pair positionable into a predetermined code. Based on the difference and variety of package size, it is obvious that the individual shipping containers or packages vary greatly in overall dimension. Accordingly, the individual plates are selectively positionable relative to one another on a plurality of platforms wherein the platforms are movable over the supporting portion or surface of the base so as to be able to position at least one plate and attendant pin pair into penetrating relation to the outer shipping container or carton and into penetrating engagement with one of a pluralty of packages maintained on the interior of the carton.

Accordingly, by using the above set forth assembly and system, each of a large number of packages, to be sold, may be coded in a non-obtrusive manner but wherein each package is clearly identifiable through the interpretation of the pair of puncture apertures in a predetermined code designation. This is accomplished by use of a template preferably formed of a transparent material but having a target indicator located in a center or other fixed reference position and a plurality of other secondary indicators varying in spaced position relative to the target indicator wherein the preset position of each of the secondary indicators is representative of a different code. Applying the template in overlying relation to the punctured side or end of the package and aligning the target indicator with the target aperture clearly indicates what code is present on the given package by aligning the other aperture in the package with one of the other secondary indicators. Each of the secondary indicators may be numbered or otherwise identified as representing a given preset code.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 3 is a sectional view along line 3—3 of FIG. 2 showing details of the pin bearing plate and supporting platforms on which the plates are selectively positioned.

FIG. 4 is an isometric view in partial exploded form and partial cutaway showing placement of the plates, pin supporting grids and supporting platform relative to one another.

FIG. 5 is an isometric view in partial cutaway and exploded form showing another embodiment of the pin bearing plate and supporting grid thereon.

FIG. 6 is a top plan view along line 6—6 of FIG. 4 showing exterior surface details of the grid on which the floating pins are mounted.

FIG. 7 is a front plan view of one embodiment of a template structure used for decoding of the coded packages as shown in FIG. 1.

FIG. 8 is a front plan view of another embodiment of a template structure similar to that of FIG. 7.

Like reference numerals refer to like parts throughout the several views of the drawings.

DETAILED DESCRIPTION OF THE PREFERRED EMBODIMENT

Figure 1:
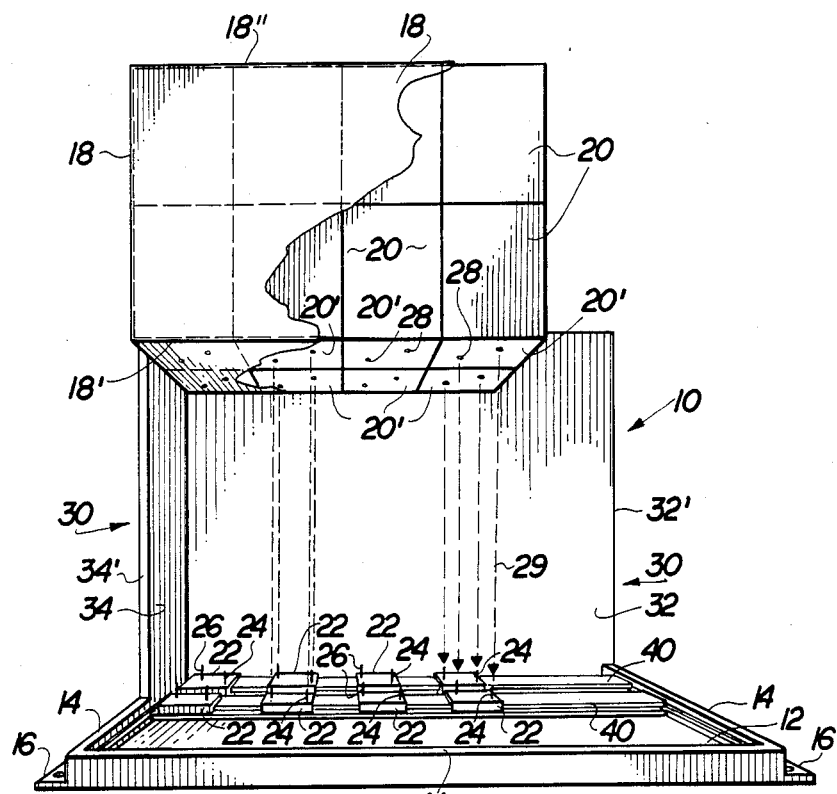
FIG. 1 is an isometric view of the coding assembly of the present invention with a plurality of packages, to be coded, contained within a shipping container in partial cutaway immediately prior to being placed on the base of the subject coding assembly.
Figure 2:
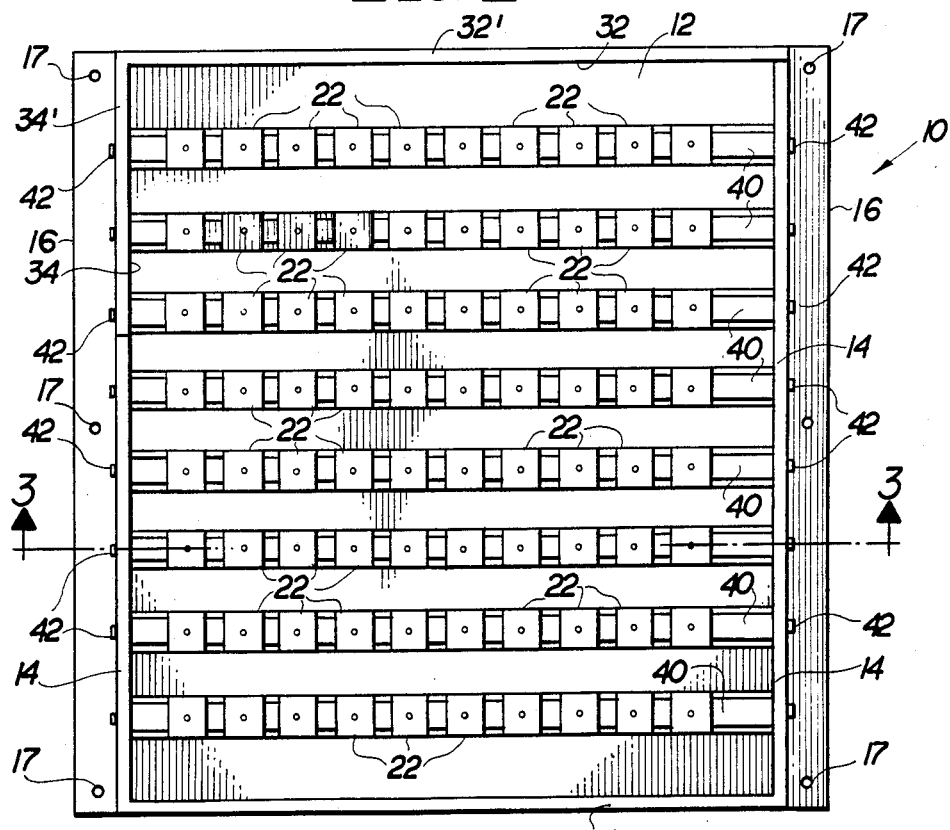
FIG. 2 is a top plan view of the embodiment of FIG. 1 differing only in the size and number of the plurality of coding pin bearing plates mounted on the base.

As shown in FIGS. 1 and 2, the coding assembly of the present invention is generally indicated as 10 and comprises a base portion 12 having a surrounding peripheral border 14 and mounting facilities which may include outstanding mounting or connecting flanges 16. As best shown in FIG. 2, apertures 17 are provided to accommodate connecting elements such as screws, nails, etc. Accordingly, the base of the assembly 10 can be mounted on any type of supporting surface and be readily positionable into a convenient location for interaction with a shipping or storage carton 18.

Carton 18 is made of a penetrable material and is of the type commonly found in commerce for the storage and containment of a plurality of smaller packages 20 arranged in a substantially stacked or adjacently positioned array as shown in FIG. 1. The base 12 includes a supporting portion which in essence may be considered a supporting surface for an end 18' of carton or container 18. The individual plates 22 are also specifically structured to support a pair of coding pins shown more clearly in FIGS. 3, 4 and 5. With reference to FIG. 1, each pair of coding pins includes a target pin 24 and a secondary pin 26. Both pins 24 and 26 of each pair is specifically positioned relative to the end or side 18' of container 18 so as to penetrate through the end 18' into penetrating engagement with a correspondingly positioned end 20' of the respective packages 20. The result is the implanting of two puncture apertures 28 in each end 20' of the respective packages 20. As shown by directional lines in phantom 29, appropriately positioned pairs of pins 24, 26 result in the placement of correspondingly positioned puncture apertures 28. Accordingly, the placement of such specifically located puncture apertures 28 causes a coding of each of the respective packages 20 without removing such packages from the interior of the container 18. Each such end 18' and 18" may be oriented into engaging relation with the supporting surface defined by the plurality of plates 22 and the upstanding outwardly projecting pins 24, 26 merely by re-orienting the carton 18 in a reverse orientation from that shown in FIG. 1 so that all the packages 20 can be properly coded through the placement of puncture apertures therein.

Due to the fact that the packages 20, depending upon the product being sold or shipped, may vary greatly in size and configuration, it follows that the shipping container or carton 18 also may vary greatly in overall dimensions. Accordingly, a positioning means generally indicated as 30 comprises two barrier surfaces 32 and 34 which are defined by perpendicularly positioned inner surfaces of sidewalls 32' and 34' joined together to form an upstanding corner which projects upwardly from one corner of the peripheral boundary or flange 14. Accordingly, regardless of the overall dimensions of the container 18, its engagement with correspondingly positioned outer surfaces against the positioning surfaces 32 and 34 will cause a "centering" or referencing location of the carton 18 onto the plurality of plates 22 and upstanding coding pins 24, 26.

In order to insure each of the packages 20 are punctured, a plurality of plates 22 are each mounted on one of a plurality of support platforms 40 wherein the platforms are arranged in parallel, spaced relation to one another along a length of the base 12 and, preferably attached at opposite ends of each support platform 40 by connectors 42.

With reference to FIGS. 3 through 6, details of the plates 22, pins 24, 26 and support platforms 40 are disclosed and explained in greater detail. With reference to FIG. 3, a connector structure 40 may be connected to opposite ends or, as shown in FIG. 3, passed through the length of the spport platforms 40 wherein opposite ends of each of the support platforms 40 is secured to the upstanding peripheral flange 14. It should be emphasized that in FIG. 2, the number of platforms 40 are greater than that shown in FIG. 1 and accordingly, the number of mounted supporting pin plates 22 is greater but the plates are smaller in size than that shown in FIG. 1.

Turning to FIG. 4, the embodiment shown therein shows a plate 22 having a recess or cutout portion 46 formed in the undersurface thereof so that the plate 22 may effectively straddle the upwardly extending center longitudinal strip 48 of support platform 40. As should be readily apparent, the plate 22 is positionable at various locations along the length of the support platform 40 by a connector screw or like element 50 extending through centrally located apertures 52 and 53 located in pin supporting matrix 55 and the plate itself 22. The connector 50 then fits into one of a plurality of spaced apart fittings or holes 56 for selective placement of the plate 22 and each of a number of plates 22 (see FIGS. 1 and 2) along the length of the support platform 40 and particularly the raised central portion 48.

Similarly, in the embodiment of FIG. 5, the support platform 40' has an elongated configuration with the central portion 48' having outwardly extending lateral edges 57 overlying undercut portions 59 extending along the length of the platform 40' and essentially beneath the raised portion 48'. The modification as shown in FIG. 3 of the support plate 22' is structured such that the recess portion 46' is further flanked b.y channels 60 disposed and dimensioned to ride on and along the length of the outwardly extending edges 57 of the raised central portion 48'.

In each of the embodiments of FIGS. 4 and 5, each of the plates 22 and 22' include a pin orienting and bearing matrix 55 having a plurality of apertures 62 formed in an evenly spaced apart array over the entire face of the matrix 55. However, one such aperture as at 62' may be designated a reference position and may define the placement of a target pin 24. By comparison, a secondary pin 26 may be located in any one of the other plurality of apertures 62 of matrix 55 and such preset location defines a given code. Accordingly, the difference in the "codes" placed or implanted into the ends 20' of the individual packages 20 is dependent upon the relative position of secondary pin 26 to the fixed target pin 24 always maintained in a reference position as at 62'. It should be emphasized that the reference position 62' does not have to be a cornermost aperture but may be any aperture as long as it is maintained as the reference position for any given set of codes.

To re-emphasize and with reference to FIG. 1, placement and the specific orientation of the apertures 28 relative to one another defines a given code implanted in end 20' of each of the packages 20. Such "given code" is dependent of course upon the placement of the secondary pin 26 relative to the target pin 24 as the secondary pin 26 may be mounted in any one of a plurality of pin apertures 62 while the target pin remains in a referenced position as at 62'.

With reference to FIGS. 7 and 8, decoding or "identifying" of any of the packages 20 found on the open shelf can readily be accomplished by placement of a template means 70 or 70' in overlying relation to the end 20' which has the puncture apertures 28 thereon. Typically, the template means 70, 70' is made from a clear, transparent or translucent material which may be in flexible sheet form and of sufficient dimension to overlie the entire end 20' of any one of the packages 20. Further, a plurality of indicator elements 72 may be formed thereon in viewable position wherein the plurality of indicator elements 72 includes a target indicator 74 and a plurality of other secondary indicators 76. First with reference to the template means 70 as shown in FIG. 7, each of the secondary indicators are numbered and such numbers correspond to informational indicia on the corresponding numbered lines as shown in the lower half of the template means 70. Accordingly, in operation, the target indicator 74 is placed over one of the apertures 28 in the end 20' of package 20. The other aperture of the pair of puncture apertures 28 will thereafter fall into one of the secondary indicators 76. The number on said secondary indicator will be indicative of a specific code, territorial area, geographical location, etc. and may be indicated on the plurality of inforational indicia lists as set forth on the bottom of template 70. FIG. 8 is the same structural configuration as FIG. 7 with the exception of the listing of the specific code indicators appearing at the bottom of FIG. 7.

It is therefore to be understood that the following claims are intended to cover all of the generic and specific features of the subject invention herein described, and all statements of the scope of the invention which as a matter of language, might be said to fall therebetween.

Now that the invention has been described,

What is claimed is:

1. A coding assembly used for the simultaneous encoding of a plurality of packages while disposed in a substantially stacked array within a shipping carton or like container, said assembly comprising:
   (a) a base dimensioned and configured for supporting one end of the carton containing the plurality of packages thereon,
   (b) positioning means mounted on said base and structured to engage portions of said carton and disposed for positioning of the end of the carton on said base in a consistent orientation relative to a supporting surface thereof,
   (c) a plurality of coding pins projecting outwardly from said supporting surface of said base and being of sufficient length to penetrate both the carton end and correspondingly positioned packages,
   (d) said plurality of coding pins arranged in pin pairs, each pin pair disposed on said supporting surface in corresponding position and penetrating relation to one package disposed within the carton adjacent the carton end supported on said base,
   (e) each of said pin pairs comprising a target pin and a secondary pin, said target pin disposed in a fixed reference position and said secondary pin disposed in one of a plurality of spaced positions relative to said target pin, and
   (f) each of a plurality of codes formed in said packages and said pin pairs being defined by the position of said secondary pin relative to said target pin.

2. An assembly as in claim 1 wherein said positioning means comprises at least two barrier elements disposed above said support surface of said base and adjacent different sides thereof and further disposed to engage a different two sides of the carton being supported on said base.

3. An assembly as in claim 2 wherein said positioning means comprises adjacently positioned surfaces disposed in substantially transverse relation to one another adjacent a periphery of said supporting surface.

4. An assembly as in claim 3 wherein said adjacently positioned surfaces comprise wall surfaces of said base extending upwardly from said support surface to define a right angled corner of said base dimensioned to engage a corner and adjacent sides of the carton for positioning thereof on said supporting surface of said base.

5. An assembly as in claim 1 wherein said pin pair is mounted on one of a plurality of plates, said plurality of plates movable on said base and at least partially collectively defining said supporting surface, said plurality of plates and respective pin pairs thereon adjustably positionable over said support surface in aligned relation with the packages within said the carton.

6. An assembly as in claim 5 wherein said target pin is fixedly positioned on said plate at said reference position and said secondary pin is selectively positioned at one of a plurality of preset positions formed on said plate and each disposed a spaced distance from said target pin.

7. An assembly as in claim 5 further comprising a plurality of platforms each positioned along a length of said base adjacent said supporting surface and each platform having an elongated configuration and one set of plates of said plurality of plates mounted thereon.

8. An assembly as in claim 7 wherein each plate of each set is movable along the length of said respective one of said platforms and thereby adjustable into corresponding position with individual ones of the plurality of packages within the carton.

9. An assembly as in claim 8 wherein each plate of said separate sets of plates are slidable along a length of a respective one of said platforms.

10. An assembly as in claim 8 wherein each of said plates is selectively positionable into one of a plurality of plate positions along a length of said respective platforms.

11. An assembly as in claim 1 further comprising template means for decoding puncture apertures formed in the packages by one of said pin pairs, said template means comprising a plurality of pin indicators comprising a target indicator and a number of secondary indicators spaced from said target indicator at varying locations.

12. An assembly as in claim 11 wherein each of said target indiators is disposed at one of a plurality of preset portions each disposed on a different spaced location from said target indicator and each representative of a different code.

13. An assembly as in claim 12 wherein said template means is formed of a transparent planar sheet material, said reference indicator and each of said secondary indicators viewable on said sheet material and thereby locatable relative to puncture apertures located in each of said respective packages.

14. An assembly as in claim 11 wherein said template means is sized for selective positioning in overlying relation to a package end in which said puncture apertures are formed.

* * * * *